United States Patent
Craig et al.

(10) Patent No.: US 8,478,828 B2
(45) Date of Patent: Jul. 2, 2013

(54) METHODS, SYSTEMS, AND COMPUTER READABLE MEDIA FOR INTER-DIAMETER-MESSAGE PROCESSOR ROUTING

(75) Inventors: Jeffrey Alan Craig, Durham, NC (US); Mark Edward Kanode, Apex, NC (US); Kedar Kashinath Karmarkar, Pune (IN); David Michael Sprague, Raleigh, NC (US); Mahesh Tomar, Morrisville, NC (US); Donald E. Wallace, Evergreen, CO (US)

(73) Assignee: Tekelec, Inc., Morrisville, NC (US)

( * ) Notice: Subject to any disclaimer, the term of this patent is extended or adjusted under 35 U.S.C. 154(b) by 322 days.

(21) Appl. No.: 13/025,968

(22) Filed: Feb. 11, 2011

(65) Prior Publication Data
US 2011/0202684 A1    Aug. 18, 2011

Related U.S. Application Data

(60) Provisional application No. 61/304,310, filed on Feb. 12, 2010.

(51) Int. Cl.
*G06F 15/16* (2006.01)
(52) U.S. Cl.
USPC ........... 709/206; 709/220; 709/224; 709/228; 370/352; 370/354
(58) Field of Classification Search
USPC .................. 709/206, 220, 224, 228; 370/352, 370/354
See application file for complete search history.

(56) References Cited

U.S. PATENT DOCUMENTS

| 5,228,083 | A | | 7/1993 | Lozowick et al. |
| 5,719,861 | A | | 2/1998 | Okanoue |
| 6,157,621 | A | * | 12/2000 | Brown et al. ............. 370/310 |
| 6,273,622 | B1 | | 8/2001 | Ben-David |

(Continued)

FOREIGN PATENT DOCUMENTS

| CA | 2 716 544 A1 | 12/2010 |
| EP | 1 134 939 A1 | 9/2001 |

(Continued)

OTHER PUBLICATIONS

Notice of Allowance and Fee(s) Due for U.S. Appl. No. 13/026,162 (Dec. 19, 2012).

(Continued)

*Primary Examiner* — Khanh Dinh
(74) *Attorney, Agent, or Firm* — Jenkins, Wilson, Taylor & Hunt, P.A.

(57) ABSTRACT

According to one aspect, the subject matter described herein includes a method for routing Diameter messages. The method includes steps occurring at a Diameter signaling router (DSR) comprising a plurality of Diameter message processors. The method also includes receiving, by a first of the plurality of Diameter message processors and from a first Diameter node, a Diameter message, wherein the Diameter message is received via a first Diameter connection. The method further includes determining, by the first Diameter message processor, a next-hop Diameter node for the Diameter message. The method further includes communicating, by the first of the plurality of Diameter message processors and to a second of the plurality of Diameter message processors, the Diameter message. The method further includes communicating, by the second Diameter message processor and to the next-hop Diameter node, the Diameter message, wherein the Diameter message is communicated via a second Diameter connection.

20 Claims, 12 Drawing Sheets

U.S. PATENT DOCUMENTS

| | | |
|---|---|---|
| 6,304,273 B1 | 10/2001 | Bonnet |
| 6,584,073 B1 | 6/2003 | Steele, Jr. et al. |
| 6,795,546 B2 | 9/2004 | Delaney et al. |
| 6,865,153 B1 | 3/2005 | Hill et al. |
| 6,915,345 B1 | 7/2005 | Tummala et al. |
| 6,918,041 B1 | 7/2005 | Chen |
| 6,954,790 B2 | 10/2005 | Forslöw |
| 6,967,956 B1 | 11/2005 | Tinsley et al. |
| 7,042,877 B2 | 5/2006 | Foster et al. |
| 7,043,000 B2 | 5/2006 | Delaney et al. |
| 7,136,635 B1 | 11/2006 | Bharatia et al. |
| 7,257,636 B2 | 8/2007 | Lee et al. |
| 7,286,516 B2 | 10/2007 | Delaney et al. |
| 7,292,592 B2 | 11/2007 | Rune |
| 7,298,725 B2 | 11/2007 | Rune |
| 7,333,438 B1 | 2/2008 | Rabie et al. |
| 7,333,482 B2 | 2/2008 | Johansson et al. |
| 7,383,298 B2 | 6/2008 | Palmer et al. |
| 7,403,492 B2 * | 7/2008 | Zeng et al. ..................... 370/254 |
| 7,403,537 B2 | 7/2008 | Allison et al. |
| 7,466,807 B2 | 12/2008 | McCann et al. |
| 7,551,926 B2 | 6/2009 | Rune |
| 7,567,796 B2 | 7/2009 | Tammi et al. |
| 7,583,963 B2 | 9/2009 | Tammi et al. |
| 7,590,732 B2 * | 9/2009 | Rune ............................. 709/225 |
| 7,633,872 B2 | 12/2009 | Pitcher et al. |
| 7,633,969 B2 | 12/2009 | Caugherty et al. |
| 7,706,343 B2 | 4/2010 | Delaney et al. |
| 7,792,981 B2 | 9/2010 | Taylor |
| 7,822,023 B2 | 10/2010 | Lahetkangas et al. |
| 7,898,957 B2 | 3/2011 | Lea et al. |
| 7,916,685 B2 | 3/2011 | Schaedler et al. |
| 7,961,685 B2 | 6/2011 | Suh et al. |
| 7,996,007 B2 | 8/2011 | Bantukul |
| 7,996,541 B2 | 8/2011 | Marathe et al. |
| 8,041,021 B2 | 10/2011 | Xu et al. |
| 8,045,983 B2 | 10/2011 | Bantukul |
| 8,170,035 B2 | 5/2012 | Furey et al. |
| 8,170,055 B2 | 5/2012 | Fang et al. |
| 2001/0024443 A1 | 9/2001 | Alriksson et al. |
| 2002/0049901 A1 | 4/2002 | Carvey |
| 2002/0051427 A1 | 5/2002 | Carvey |
| 2002/0087723 A1 | 7/2002 | Williams et al. |
| 2002/0133494 A1 | 9/2002 | Goedken |
| 2002/0133534 A1 | 9/2002 | Forslow |
| 2002/0141346 A1 * | 10/2002 | Garcia-Luna-Aceves et al. ........................... 370/238 |
| 2002/0181507 A1 | 12/2002 | Jones |
| 2003/0095536 A1 | 5/2003 | Hu et al. |
| 2003/0115358 A1 * | 6/2003 | Yun ................. 709/238 |
| 2004/0037278 A1 | 2/2004 | Wong et al. |
| 2004/0042485 A1 | 3/2004 | Gettala et al. |
| 2004/0098612 A1 | 5/2004 | Lee et al. |
| 2005/0002417 A1 | 1/2005 | Kelly et al. |
| 2005/0099964 A1 | 5/2005 | Delaney et al. |
| 2005/0232236 A1 | 10/2005 | Allison et al. |
| 2005/0232407 A1 | 10/2005 | Craig et al. |
| 2005/0235065 A1 | 10/2005 | Le et al. |
| 2005/0246545 A1 | 11/2005 | Reiner |
| 2006/0045249 A1 | 3/2006 | Li et al. |
| 2006/0077926 A1 | 4/2006 | Rune |
| 2006/0101159 A1 | 5/2006 | Yeh et al. |
| 2006/0104210 A1 | 5/2006 | Nielsen |
| 2006/0123477 A1 | 6/2006 | Raghavan et al. |
| 2006/0172730 A1 | 8/2006 | Matsuda |
| 2006/0177007 A1 | 8/2006 | Vaghar et al. |
| 2006/0200670 A1 | 9/2006 | Kuffel et al. |
| 2006/0221972 A1 | 10/2006 | Bhargava et al. |
| 2006/0253563 A1 | 11/2006 | Yang et al. |
| 2006/0274744 A1 | 12/2006 | Nagai et al. |
| 2007/0047539 A1 | 3/2007 | Agarwal et al. |
| 2007/0153995 A1 | 7/2007 | Fang et al. |
| 2007/0168421 A1 | 7/2007 | Kalyanpur et al. |
| 2007/0214209 A1 | 9/2007 | Maeda |
| 2007/0280447 A1 | 12/2007 | Cai et al. |
| 2007/0297419 A1 | 12/2007 | Asherup et al. |
| 2008/0025230 A1 | 1/2008 | Patel et al. |
| 2008/0039104 A1 | 2/2008 | Gu et al. |
| 2008/0144602 A1 | 6/2008 | Casey |
| 2008/0167035 A1 | 7/2008 | Buckley et al. |
| 2008/0301162 A1 | 12/2008 | Wall et al. |
| 2008/0317247 A1 | 12/2008 | Jeong et al. |
| 2009/0080440 A1 | 3/2009 | Balyan et al. |
| 2009/0129271 A1 | 5/2009 | Ramankutty et al. |
| 2009/0138619 A1 | 5/2009 | Schnizlein et al. |
| 2009/0185494 A1 | 7/2009 | Li et al. |
| 2009/0232011 A1 | 9/2009 | Li et al. |
| 2010/0042525 A1 | 2/2010 | Cai et al. |
| 2010/0135287 A1 | 6/2010 | Hosain et al. |
| 2010/0265948 A1 | 10/2010 | Patel et al. |
| 2010/0299451 A1 | 11/2010 | Yigang et al. |
| 2011/0060830 A1 | 3/2011 | Kang et al. |
| 2011/0116378 A1 | 5/2011 | Ramankutty et al. |
| 2011/0116382 A1 | 5/2011 | McCann et al. |
| 2011/0188397 A1 | 8/2011 | McCann et al. |
| 2011/0199895 A1 | 8/2011 | Kanode et al. |
| 2011/0199906 A1 | 8/2011 | Kanode et al. |
| 2011/0200047 A1 | 8/2011 | McCann et al. |
| 2011/0200053 A1 | 8/2011 | Kanode et al. |
| 2011/0200054 A1 | 8/2011 | Craig et al. |
| 2011/0202604 A1 | 8/2011 | Craig et al. |
| 2011/0202612 A1 | 8/2011 | Craig et al. |
| 2011/0202613 A1 | 8/2011 | Craig et al. |
| 2011/0202614 A1 | 8/2011 | Craig et al. |
| 2011/0202676 A1 | 8/2011 | Craig et al. |
| 2011/0202677 A1 | 8/2011 | Craig et al. |
| 2011/0225280 A1 | 9/2011 | Delsesto et al. |
| 2011/0225306 A1 | 9/2011 | Delsesto et al. |
| 2011/0302244 A1 | 12/2011 | McCann et al. |
| 2011/0314178 A1 | 12/2011 | Kanode et al. |
| 2012/0155389 A1 | 6/2012 | McNamee et al. |
| 2012/0224524 A1 | 9/2012 | Marsico |

FOREIGN PATENT DOCUMENTS

| | | |
|---|---|---|
| EP | 1 328 102 A1 | 7/2003 |
| EP | 1 465 385 A1 | 10/2004 |
| EP | 1 314 324 B1 | 8/2008 |
| EP | 1 847 076 B1 | 2/2012 |
| WO | WO 2008/087633 A2 | 7/2008 |
| WO | WO 2009/058067 A1 | 5/2009 |
| WO | WO 2009/070179 A1 | 6/2009 |
| WO | WO 2009/134265 A1 | 11/2009 |
| WO | WO 2011/047382 A2 | 4/2011 |
| WO | WO 2011/100594 A2 | 8/2011 |
| WO | WO 2011/100600 A2 | 8/2011 |
| WO | WO 2011/100603 A2 | 8/2011 |
| WO | WO 2011/100606 A2 | 8/2011 |
| WO | WO 2011/100609 A2 | 8/2011 |
| WO | WO 2011/100610 A2 | 8/2011 |
| WO | WO 2011/100612 A2 | 8/2011 |
| WO | WO 2011/100615 A2 | 8/2011 |
| WO | WO 2011/100621 A2 | 8/2011 |
| WO | WO 2011/100626 A2 | 8/2011 |
| WO | WO 2011/100629 A2 | 8/2011 |
| WO | WO 2011/100630 A2 | 8/2011 |
| WO | WO 2012/119147 A1 | 9/2012 |

OTHER PUBLICATIONS

Final Official Action for U.S. Appl. No. 13/026,076 (Dec. 7, 2012).

Communication of European Publication Number and Information on the Application of Article 67(3) EPC for European Patent Application No. 11742923.3 (Nov. 21, 2012).

Communication of European Publication Number and Information on the Application of Article 67(3) EPC for European Patent Application No. 11742912.6 (Nov. 21, 2012).

Communication of European Publication Number and Information on the Application of Article 67(3) EPC for European Patent Application No. 11742909.2 (Nov. 21, 2012).

Communication of European Publication Number and Information on the Application of Article 67(3) EPC for European Patent Application No. 11742906.8 (Nov. 21, 2012).

Communication of European Publication Number and Information on the Application of Article 67(3) EPC for European Patent Application No. 11742905.0 (Nov. 21, 2012).

Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).
Advisory Action for U.S. Appl. No. 12/906,816 (Jun. 5, 2012).
Non-Final Official Action for U.S. Appl. No. 13/026,076 (Jun. 4, 2012).
Applicant-Initiated Interview Summary for U.S. Appl. No. 12/906,816 (May 17, 2012).
Non-Final Official Action for U.S. Appl. No. 13/026,105 (May 16, 2012).
Final Official Action for U.S. Appl. No. 13/026,105 (Nov. 26, 2012).
Non-Final Official Action for U.S. Appl. No. 13/026,153 (Nov. 6, 2012).
Non-Final Official Action for U.S. Appl. No. 13/412,352 (Oct. 26, 2012).
Non-Final Official Action for U.S. Appl. No. 13/026,144 (Oct. 16, 2012).
Non-Final Official Action for U.S. Appl. No. 13/026,098 (Sep. 20, 2012).
Non-Final Official Action for U.S. Appl. No. 13/026,060 (Sep. 19, 2012).
Communication of European Publication Number and Information on the Application of Article 67(3) EPC for European Patent Application No. 11742921.7 (Sep. 12, 2012).
Non-Final Official Action for U.S. Appl. No. 13/026,081 (Sep. 12, 2012).
Non-Final Official Action for U.S. Appl. No. 13/026,112 (Aug. 29, 2012).
Communication of European publication number and information on the application of Article 67(3) EPC for European Application No. 10824243.9 (Jul. 25, 2012).
Notification of Transmittal of the International Search Report and the Written Opinion of the International Searching Athority, or the Declaration for International Patent Application No. PCT/US2012/027736 (Jun. 12, 2012).
Traffix Systems, "Datasheet; Traffix Signaling Delivery Controller (SDC)," pp. 1-5 (May 2011).
Notification of Transmittal of the International Search Report and the Written Opinion of the International Searching Authority, or the Declaration for International Application No. PCT/US2010/053062 (Jun. 28, 2011).
Znaty, "Diameter, GPRS, (LTE+ePC=EPS), IMS, PCC and SDM," EFORT, pp. 1-460 (May 2010).
"Ericsson Unified Number Portability," (Downloaded from the Internet on Jan. 24, 2011).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0 pp. 1-129 (Mar. 2010).
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunications Systems (UMTS); LTE; InterWorking Function (IWF) Between MAP Based and Diameter Based Interfaces (3GPP TS 29.305 Version 9.0.0 Release 9),"ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).

"Mapping Diameter Interfaces to Functionally in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).
3GPP, "3rd Generation Partnership Project; Technical Specifiction Group Service and System Aspects; Telecommunication Management; Charging Management; Diameter Charging Applications (Release 9)," 3GPP TS 32.299 V9.2.0 (Dec. 2009).
3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).
3GPP, "3rd Generation Partnership Project; Technical Specification Group Core Network and Terminals; IP Multimedia (IM) Subsystem Sh Interface; Signalling Flows and Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).
3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control Over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).

Fajardo et al., "Diameter Base Protocol," DIME Internet-Draft, draft-ietf-dime-rfc3588bis-19.txt, pp. 1-160 (Sep. 2, 2009).

3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109. V8.3.0 (Sep. 2009).

3GPP, "3rd Generation Partnership Project; Technical Specification Group Core Network and Terminals; Numbering, Addressing and Identification (Release 8)," 3GPP TS 23.003 V8.6.0 (Sep. 2009).

Jones et al., "Diameter Extended NAPTR," Internet-Draft, draft-jones-dime-extended-naptr-00, pp. 1-8 (Aug. 23, 2009).

Korhonen et al., "Diameter User-Name and Realm Based Request Routing Clarifications," Internet-Draft, draft-ietf-dime-nai-routing-03.txt, pp. 1-11 (Aug. 19, 2009).

Tsou et al., "Session-Spectific Explicit Diameter Request Routing," Network Working Group Internet-Draft, draft-tsou-diameter-explicit-routing-03, pp. 1-18 (Aug. 5, 2009).

3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).

Bhardwaj, "Roaming Hubbing & LTE," GSMA London, pp. 1-11 (May 19, 2009).

3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).

3GPP, "3rd Generation Partnership Project; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).

Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).

Aboba et al., "The Network Access Identifier," Network Working Group, RFC 4282, pp. 1-17 (Dec. 2005).

3GPP, "3rd Generation Partnership Project; Technical Specification Group Core Network and Terminals; Policy Control Over Go Interface (Release 6)," 3GPP TS 29.207 V6.5.0 (Sep. 2005).

Eronen et al., "Diameter Extensible Authentication Protocol (EAP) Application," Network Working Group, RFC 4072, pp. 1-31 (Aug. 2005).

Hakala et al., "Diameter Credit-Control Application," Network Working Group RFC 4006, pp. 1-107 (Aug. 2005).

Calhoun et al., "Diameter Mobile IPv4 Application," Network Working Group, RFC 4004, pp. 1-50 (Aug. 2005).

3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 20Q4).

Calhoun et al., "Diameter Base Protocol," Network Working Group, RFC 3588, pp. 1-148 (Sep. 2003).

Aboba et al., "Authentication, Authorization and Accounting (AAA) Transport Profile," Network Working Group, RFC 3539, pp. 1-39 (Jun. 2003).

Stewart et al., "Stream Control Transmission Protocol," Network Working Group RFC 2960, pp. 1-134 (Oct. 2000).

Greene et al., "Bi-Directional Session Setup Extension to Diameter," Internet Draft <draft-greene-diameter-ss7-session-00.txt>, pbs. 1-12 (Jul. 1998).

"Diameter Overview," referenced from www.ulticom.com/html/products/signalware-diameter-reference-guide.asp (Publication Date Unknown).

Final Official Action for U.S. Appl. No. 12/906,816 (Feb. 21, 2012).

Applicant-Initiated Interview Summary for U.S. Appl. No. 12/906,816 (Jan. 27, 2012).

Notification of Transmittal of the International Search Report and the Written Opinion of the International Searching Authority, or the Declaration for International Application No. PCT/US2011/024622 (Oct. 31, 2011).

Notification of Transmittal of the International Search Report and the Written Opinion of the International Searching Authority, or the Declaration for International Application No. PCT/US2011/024617 (Oct. 31, 2011).

Notification of Transmittal of the International Search Report and the Written Opinion of the International Searching Authority, or the Declaration for International Application No. PCT/US2011/024614 (Oct. 31, 2011).

Notification of Transmittal of the International Search Report and the Written Opinion of the International Searching Authority, or the Declaration for International Application No. PCT/US2011/024646 (Oct. 28, 2011).

Notification of Transmittal of the International Search Report and the Written Opinion of the International Searching Authority, or the Declaration for International Application No. PCT/US2011/024645 (Oct. 28, 2011).

Notification of Transmittal of the International Search Report and the Written Opinion of the International Searching Authority, or the Declaration for International Application No. PCT/US2011/024642 (Oct. 28, 2011).

Notification of Transmittal of the International Search Report and the Written Opinion of the International Searching Authority, or the Declaration for International Application No. PCT/US2011/024621 (Oct. 28, 2011).

Notification of Transmittal of the International Search Report and the Written Opinion of the International Searching Authority, or the Declaration for International Application No. PCT/US2011/024637 (Oct. 27, 2011).

Notification of Transmittal of the International Search Report and the Written Opinion of the International Searching Authority, or the Declaration for International Application No. PCT/US2011/024629 (Oct. 27, 2011).

Notification of Transmittal of the International Search Report and the Written Opinion of the International Searching Authority, or the Declaration for International Application No. PCT/US2011/024625 (Oct. 25, 2011).

Notification of Transmittal of the International Search Report and the Written Opinion of the International Searching Authority, or the Declaration for International Application No. PCT/US2011/024611 (Oct. 20, 2011).

Notification of Transmittal of the International Search Report and the Written Opinion of the International Searching Authority, or the Declaration for International Application No. PCT/US2011/024601 (Oct. 20, 2011).

Notification of Transmittal of the International Search Report and the Written Opinion of the International Searching Authority, or the Declaration for International Application No. PCT/US2011/024588 (Oct. 20, 2011).

Non-Final Official Action for U.S. Appl. No. 12/906,816 (Oct. 5, 2011).

Jones et al., "Diameter Command Code Registration for the Third Generation Partnership Project (3GPP) Evolved Packet System (EPS)," Network Working Group, RFC 5516, pp. 1-5 (Apr. 2009).

Supplemental Notice of Allowability for U.S. Appl. No. 13/026,162 (Feb. 7, 2013).

Notice of Allowance and Fee(s) Due for U.S. Appl. No. 13/026,031 (Jan. 30, 2013).

Supplemental Notice of Allowability for U.S. Appl. No. 13/026,162 (Jan. 24, 2013).

* cited by examiner

Peer Routing Table (PRT)

| Destination Realm | Application ID | Destination Host | Origination Realm | Origination Host | Action | Route List Name |
|---|---|---|---|---|---|---|
| red.com | Don't Care | Don't Care | green.com | 23 | Route to Peer | BLUE_NW |
| blue.com | Don't Care | Don't Care | green.com | 45 | Route to Peer | RED_NW |
| myNW.com | 43 | Don't Care | Don't Care | 21 | Route to Peer | HSS1 |
| myNW.com | 65 | Don't Care | Don't Care | Don't Care | Route to Peer | MME2 |

Route List Table (RLT)

| Route List Name | Route Name | Priority | Weight | Route Group | Egress Conn ID | Egress MP ID |
|---|---|---|---|---|---|---|
| BLUE_NW | BLUE_PEER1 | 1 | 60 | Active | Conn_12 | MP4 |
| BLUE_NW | BLUE_PEER2 | 1 | 40 | Active | Conn_13 | MP4 |
| BLUE_NW | BLUE_PEER3 | 2 | 50 | Standby | Conn_14 | MP4 |
| BLUE_NW | BLUE_PEER4 | 2 | 50 | Standby | Conn_15 | MP4 |
| RED_NW | RED_PEER1 | 1 | 100 | Active | Conn_16 | MP5 |
| RED_NW | RED_PEER2 | 2 | 100 | Standby | Conn_17 | MP5 |
| HHS1 | HSS1_SRV1 | 1 | 100 | Active | Conn_18 | MP6 |
| MME1 | MME1_SRV1 | 1 | 100 | Active | Conn_19 | MP6 |
| MME1 | MME1_SRV2 | 2 | 100 | Standby | Conn_20 | MP7 |

Diameter vs. Non-Diameter Protocol

| Transport Attribute | Diameter | Non-Diameter<br>Message Processor-to-Message Processor |
|---|---|---|
| Ethernet/ Internet Protocol (IP) Based | Yes | Yes |
| Reliable, Connection Oriented | Yes, stream control transmission protocol (SCTP) or transmission control protocol (TCP) required | Yes, but not limited to SCTP or TCP |
| Security | Via standards-based security protocols such as Internet protocol security (IPSEC) and transport layer security (TLS) → High Overhead | Via closed/private network → No Overhead |
| Message Content | Diameter standard protocol data unit (PDU) format | Diameter standard PDU + additional proprietary fields for minimizing processing overhead over full ingress-egress path, handling error conditions, and managing in-service upgrades |
| Routing Strategy | • Diameter standard routing at each MP → High Overhead<br>• Relies primarily on static routing rules → results in perpetual message bouncing when egress paths are unavailable | • Routing optimized to minimize overhead across full ingress-to-egress path using proprietary message content, e.g., by obviating the necessity for the egress message processor (MP) node to perform another Diameter route lookup<br>• Complements static routing rules with proprietary inter-MP status sharing to choose "available" egress paths |

METHODS, SYSTEMS, AND COMPUTER READABLE MEDIA FOR INTER-DIAMETER-MESSAGE PROCESSOR ROUTING

PRIORITY CLAIM

This application claims the benefit of U.S. Provisional Patent Application Ser. No. 61/304,310, filed Feb. 12, 2010; the disclosure of which is incorporated herein by reference in its entirety.

STATEMENT OF INCORPORATION BY REFERENCE

The disclosures of each of the following commonly-owned, co-pending U.S. patent applications filed on Feb. 11, 2011 are hereby incorporated herein by reference in their entireties:

"Methods, Systems, And Computer Readable Media For Source Peer Capacity-Based Diameter Load Sharing" (Ser. No. 13/026,031);

"Methods, Systems, And Computer Readable Media For Inter-Message Processor Status Sharing," (Ser. No. 13/026,105);

"Methods, Systems, And Computer Readable Media For Providing Priority Routing At A Diameter Node," (Ser. No. 13/026,060);

"Methods, Systems, And Computer Readable Media For Providing Peer Routing At A Diameter Node," (Ser. No. 13/026,076);

"Methods, Systems, And Computer Readable Media For Providing Origin Routing At A Diameter Node," (Ser. No. 13/026,081);

"Methods, Systems, And Computer Readable Media For Providing Local Application Routing At A Diameter Node," (Ser. No. 13/026,098);

"Methods, Systems, And Computer Readable Media For Answer-Based Routing Of Diameter Request Messages," (Ser. No. 13/026,112);

"Methods, Systems, And Computer Readable Media For Performing Diameter Answer Message-Based Network Management At A Diameter Signaling Router (DSR)," (Ser. No. 13/026,125);

"Methods, Systems, And Computer Readable Media For Multi-Interface Monitoring And Correlation Of Diameter Signaling Information," (Ser. No. 13/026,133);

"Methods, Systems, And Computer Readable Media For Diameter Protocol Harmonization," (Ser. No. 13/026,144);

"Methods, Systems, And Computer Readable Media For Diameter Network Management," (Ser. No. 13/026,153); and "Methods, Systems, And Computer Readable Media For Diameter Application Loop Prevention," (Ser. No. 13/026,162).

TECHNICAL FIELD

The subject matter described herein relates to inter-Diameter-message processor routing. More specifically, the subject matter relates to methods, systems, and computer readable media for inter-Diameter-message processor routing.

BACKGROUND

The Diameter protocol is a next generation authentication, authorization, and accounting (AAA) protocol. The Diameter base protocol is defined in IETF RFC 3588, the disclosure of which is incorporated by reference herein in its entirety. Commonly used within the Internet multimedia subsystem (IMS) architecture, the Diameter protocol was derived from the remote authentication dial-in user service (RADIUS) protocol. Historically, the RADIUS protocol was employed by Internet service providers (ISPs) to provide a secure communication channel between an ISP's access server and a secure location where user credential information was stored, e.g., a lightweight directory access protocol (LDAP) server. While the RADIUS protocol provided a standardized AAA exchange protocol, the emergence of new technologies and applications necessitated the development of a protocol capable of meeting ever-changing demands. Diameter aims to extend the standardized approach of RADIUS while providing expanded functionality and remaining open to future development.

The above-referenced Diameter RFC does not specify an architecture for Diameter routing or processing nodes. Likewise, the standards do not specify a method for inter-message processor routing when a Diameter element includes a distributed architecture. Accordingly, a need exists for methods, systems, and computer readable media for inter-Diameter-message processor routing.

SUMMARY

According to one aspect, the subject matter described herein includes a method for routing Diameter messages. The method includes steps occurring at a Diameter signaling router (DSR) comprising a plurality of Diameter message processors. The method includes receiving, by a first of the plurality of Diameter message processors and from a first Diameter node, a Diameter message, wherein the Diameter message is received via a first Diameter connection. The method further includes determining, by the first of the plurality of Diameter message processors, a next-hop Diameter node for the Diameter message. The method further includes communicating, by the first Diameter message processor and to a second of the plurality of Diameter message processors, the Diameter message. The method further includes communicating, by the second Diameter message processor and to the next-hop Diameter node, the Diameter message, wherein the Diameter message is communicated via a second Diameter connection.

According to another aspect, the subject matter described herein includes a system for routing Diameter messages. The system includes a Diameter signaling router. The Diameter signaling router includes first and second Diameter message processors. The first Diameter message processor is configured to: receive, from a first Diameter node and via a first Diameter connection, a Diameter message; determine a next-hop Diameter node for the Diameter message; and communicate, to the second Diameter message processor, the Diameter message. The second Diameter message processor is configured to communicate to the next-hop Diameter node, via a second Diameter connection, the Diameter message.

According to another aspect, the subject matter described herein includes a system for routing Diameter messages. The system includes a first Diameter node and a second Diameter node. The system further includes a DSR, wherein the DSR appears to the first Diameter node as a Diameter peer having a first Diameter identity and the DSR appears to the second Diameter node as a Diameter peer having a second Diameter identity, the first and second Diameter identities being different from each other.

As used herein, the term "node" refers to a physical computing platform including one or more processors and memory.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 8 illustrates an exemplary peer routing table (PRT) for routing Diameter messages according to an embodiment of the subject matter described herein;

FIG. 9 illustrates an exemplary route list table (RLT) for routing Diameter messages according to an embodiment of the subject matter described herein;

FIG. 10 illustrates a table listing advantages associated with routing Diameter messages according to an embodiment of the subject matter described herein;

DETAILED DESCRIPTION

Methods, systems, and computer readable media for inter-Diameter-message processor routing are provided.

Figure 1:
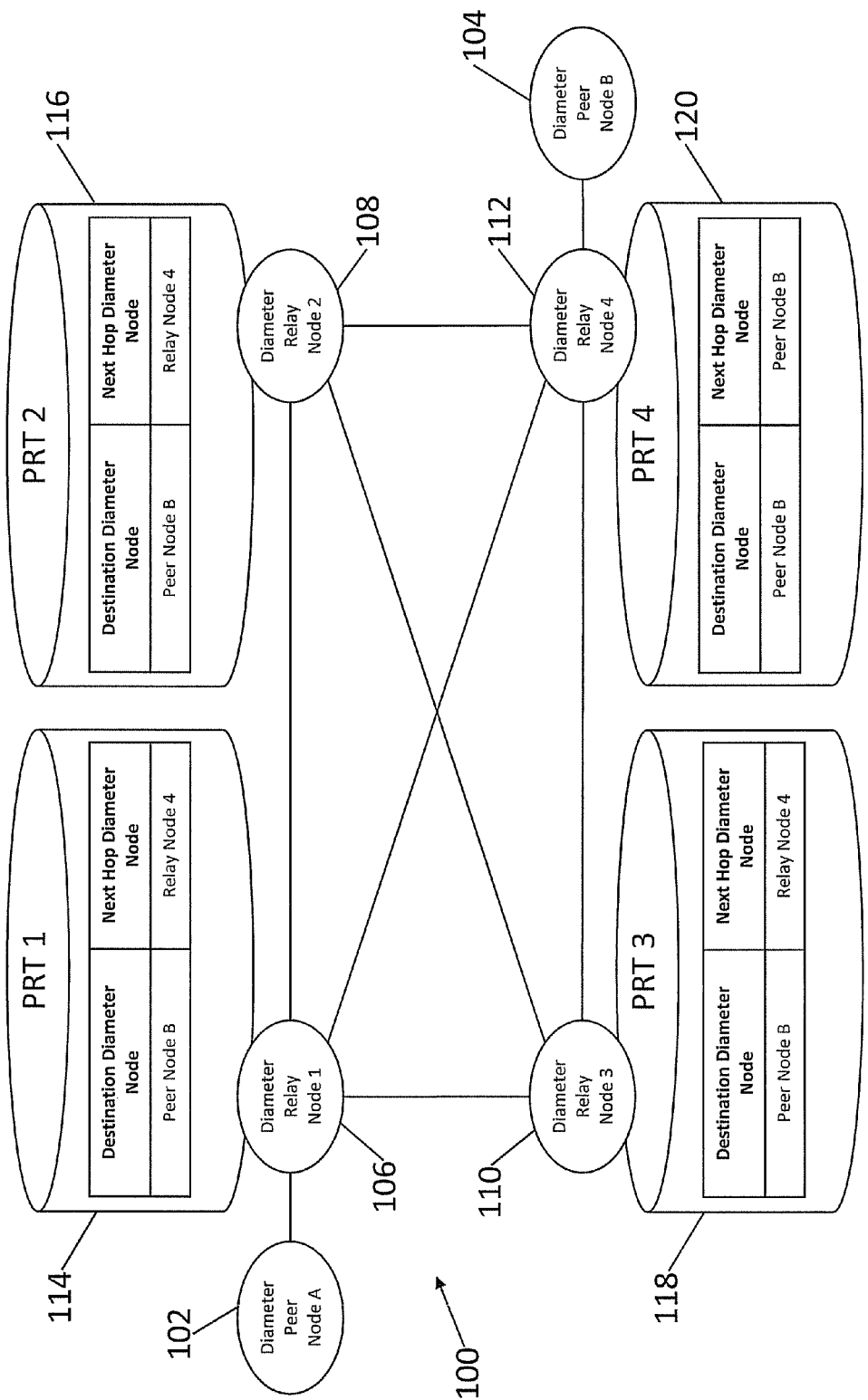
FIG. 1 is a network diagram illustrating a Diameter networking environment which implements Diameter relay nodes for routing Diameter messages between Diameter nodes.

In general, Diameter messages may be routed utilizing Diameter routing agents. Diameter routing agents may route Diameter messages from a network element towards their proper Diameter realm and destination. Additionally, Diameter routing agents may provide relay, proxy, redirect, and translation services. FIG. 1 is a network diagram illustrating a Diameter networking environment which implements Diameter relay nodes for routing Diameter messages between Diameter nodes. Referring to FIG. 1, network 100 may include Diameter peer nodes 102 and 104. Network 100 may further include Diameter relay nodes 106, 108, 110, and 112. Diameter relay nodes 106, 108, 110, and 112 may respectively utilize distinct routing information stored in distinct peer routing tables 114, 116, 118, and 120. Peer routing tables 114, 116, 118, and 120 may specify a "next hop" Diameter node for a given destination Diameter node. For example, if a Diameter message destined for Diameter peer node "B" arrives at Diameter relay node 106, PRT 114 specifies the "next hop" Diameter node as Diameter relay node 112. Similarly, if a Diameter message destined for Diameter per node "B" arrives at Diameter relay node 112, PRT 120 specifies the "next hop" Diameter node as Diameter peer node 104, the Diameter message's destination.

Figure 2:
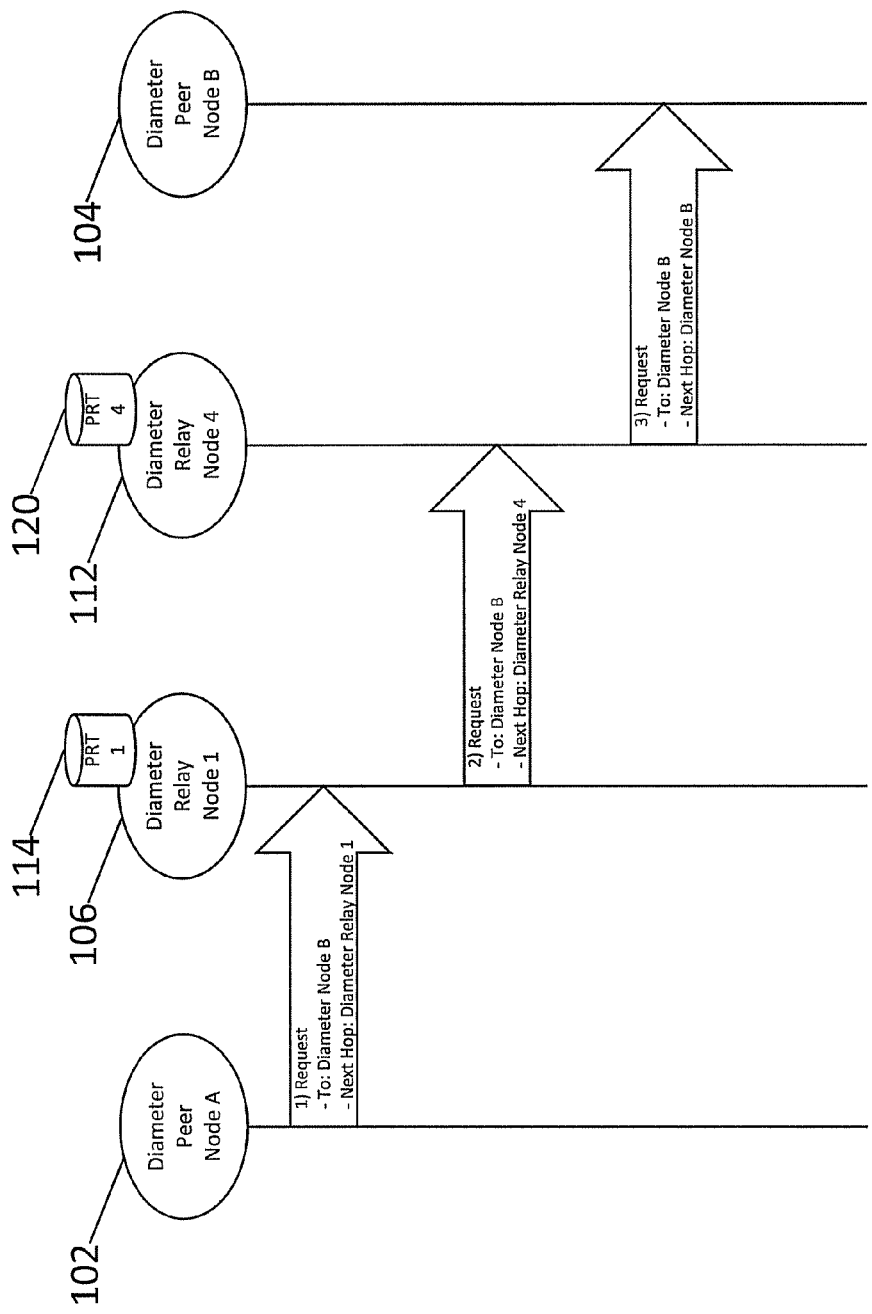
FIG. 2 is a message flow diagram illustrating the routing of a Diameter message in a Diameter networking environment which implements Diameter relay nodes for routing Diameter messages between Diameter nodes.

FIG. 2 is a message flow diagram illustrating the routing of a Diameter message in a Diameter networking environment which implements Diameter relay nodes for routing Diameter messages between Diameter nodes. Referring to FIG. 2, at step 1, Diameter peer node A 102 may send to Diameter relay node 106 a Diameter protocol request message destined for Diameter peer node B 104. Diameter relay node 106 may perform a Diameter routing lookup utilizing the routing information stored in PRT 114. The routing information stored in PRT 114 specifies that a Diameter message destined for Diameter peer node B 104 has a next hop Diameter node of Diameter relay node 112. At step 2, Diameter relay node 106 may send to Diameter relay node 112 the Diameter protocol request message destined for Diameter peer node B 104. Diameter relay node 112 may perform a Diameter routing lookup utilizing the routing information stored in PRT 120. The routing information stored in PRT 120 specifies that a Diameter message destined for Diameter peer node B 104 has a next hop Diameter node of Diameter peer node 104, the destination of the Diameter protocol request message.

As FIGS. 1 and 2 illustrate, three "hops" are required in order for a Diameter protocol message destined for Diameter peer node "B" to progress from Diameter peer node "A" 102 through Diameter networking environment 100 to Diameter peer node "B" 104: (1) from Diameter peer node 102 to Diameter relay node 106; (2) from Diameter relay node 106 to Diameter relay node 112; and (3) from Diameter relay node 112 to Diameter peer node 104. Importantly, not only are three hops required, but two Diameter routing lookups must be performed: (1) at Diameter relay node 106, using PRT 114; and (2) at Diameter relay node 112, using PRT 120. Significant overhead is associated with Diameter routing lookups and can result in limited throughput, transaction per second rates, and scalability.

FIGS. 1 and 2 are not admitted prior art. Rather, FIGS. 1 and 2 illustrate one way in which Diameter routing could be performed and the disadvantages in performing Diameter routing in this manner.

Figure 3:
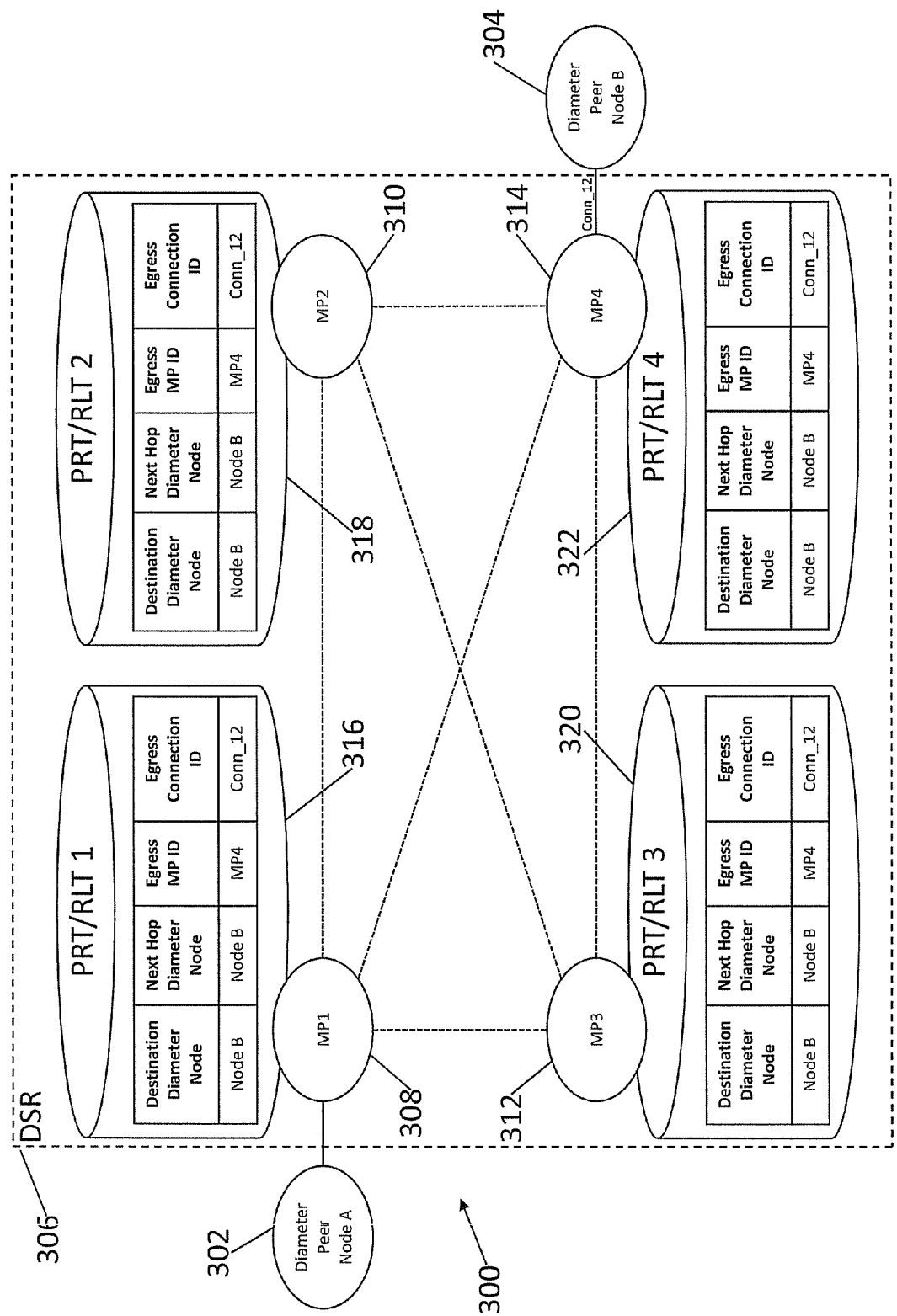
FIG. 3 is a network diagram illustrating an exemplary network that includes a Diameter signaling router (DSR) which includes multiple Diameter message processors (MPs) that utilize common routing information stored at each MP to route Diameter messages according to an embodiment of the subject matter described herein.

FIG. 3 is a network diagram illustrating an exemplary network that includes a DSR which includes multiple Diameter MPs that utilize common routing information stored at each MP to route Diameter messages according to an embodiment of the subject matter described herein. Referring to FIG. 3, network 300 may include Diameter peer node "A" 302 and Diameter peer node "B" 304. Network 300 may further include DSR 306.

DSR 306 may be any suitable entity for routing or relaying Diameter signaling messages between Diameter nodes. For example, DSR 306 may be a long term evolution (LTE) signaling router, an LTE Diameter signaling router, a Diameter signaling agent, a Diameter proxy agent, a Diameter relay agent, a Diameter routing agent, a Diameter translation agent, or a Diameter redirect agent. DSR 306 may include functionality for processing various messages. In one embodiment, DSR 306 may communicate with various Diameter nodes via one or more 3rd generation partnership project (3GPP) LTE communications interfaces. In another embodiment, DSR 306 may communicate with various Diameter nodes via one or more other (e.g., non-LTE) communications interfaces. For example, DSR 306 may communicate with Internet protocol (IP) multimedia subsystem (IMS) nodes, such as call session control functions (CSCFs), using IMS-related interfaces.

A DSR may include multiple Diameter MPs. For example, DSR 306 includes Diameter MPs 308, 310, 312, and 314. A Diameter MP may be configured to host one or more Diameter applications. A Diameter MP may be a distinct message processing module of a distributed computing platform, a computing blade in a blade-based distributed computing platform, a processing core element associated with a single or multi-core computing device, or a virtual node instantiated on a single physical message processing/computing device. A Diameter MP may utilize the Diameter protocol to route Diameter messages to external Diameter peer nodes.

DSR 306 may include multiple distinct message processing modules of a distributed computing platform, multiple computing blades in a blade-based distributed computing platform, multiple processing core elements associated with single or multi-core computing devices, or multiple virtual nodes instantiated on single physical message processing/computing devices. As such, an embodiment of DSR 306 may be located in a single distinct geographic location and communicate via an internal communications network. In an alternate embodiment, DSR 306 may include multiple elements located in geographically diverse locations and communicating via an external communications network.

Diameter MPs may be associated with a single Diameter identity. For example, Diameter MP 308 and Diameter MP 314 may be associated with a single Diameter identity "X" and appear as a single Diameter entity having Diameter identity "X," both from the perspective of Diameter peer node "A" 302 and the perspective of Diameter peer node "B" 304. In such an embodiment, DSR 306 may also appear as a single Diameter entity having Diameter identity "X," both from the perspective of Diameter peer node "A" 302 and the perspective of Diameter peer node "B" 304. In another embodiment, Diameter MPs may be associated with different Diameter identities. For example, Diameter MP 308 may be associated with Diameter identity "X" and Diameter MP 314 may be associated with Diameter identity "Y." In such an embodiment, Diameter MPs 308 and 314 may appear as single Diameter entities, respectively having Diameter identities "X" and "Y," while DSR 306 may appear as a single Diameter entity having multiple Diameter identities. For example, from the perspective of Diameter peer node "A" 302, DSR 306 may have Diameter identity "X," while from the perspective of Diameter peer node "B" 304, DSR 306 may have Diameter identity "Y."

In one embodiment, Diameter MPs may utilize copies of the same routing information stored at each Diameter MP. For example, Diameter MPs 308, 310, 312, and 314 may respectively utilize copies of the same routing information stored in PRTs and/or RLTs 316, 318, 320, and 322. In accordance with an embodiment of the subject matter described herein, Diameter MPs may use PRTs and/or RLTs for inter-MP routing. For example, Diameter MP 308 may utilize PRT/RLT 316 to route a Diameter message received from Diameter peer node "A" 302 and destined for Diameter peer node "B" 304 to egress Diameter MP 314, as identified by PRT/RLT 316. Moreover, because PRT/RLT 316 further identifies next-hop Diameter peer node "B" 304, and an egress connection ID "Conn_12" existing between Diameter MP 314 and Diameter peer node "B" 304, a subsequent Diameter lookup at Diameter MP 314 may not be required. In another embodiment, Diameter MPs may utilize common routing information stored in a shared repository.

Figure 4:
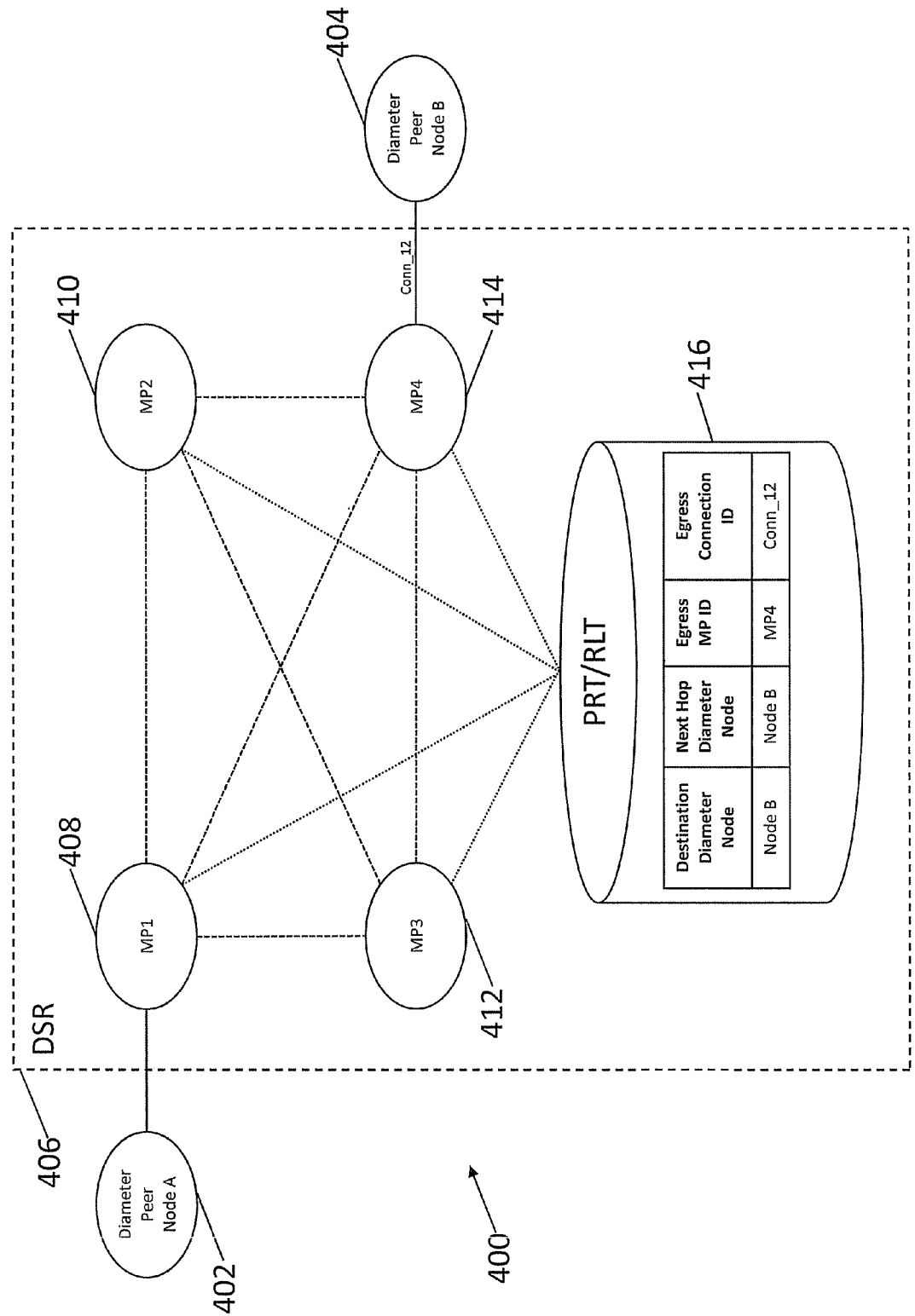
FIG. 4 is a network diagram illustrating an exemplary network that includes a DSR which includes multiple MPs that utilize common routing information stored in a shared repository to route Diameter messages according to an embodiment of the subject matter described herein.

FIG. 4 is a network diagram illustrating an exemplary network that includes a DSR which includes multiple MPs that utilize common routing information stored in a shared repository to route Diameter messages according to an embodiment of the subject matter described herein. Elements 400, 402, 404, 406, 408, 410, 412, and 414 are essentially identical to their respective counterparts 300, 302, 304, 306, 308, 310, 312, and 314 in FIG. 3, and therefore their descriptions will not be repeated here. Referring to FIG. 4, Diameter MPs may utilize common routing information stored in a shared PRT and/or a shared RLT. For example, Diameter MPs 408, 410, 412, and 414 may utilize common routing information stored in PRT/RLT table 416. As in the above example, Diameter MP 408 may utilize PRT/RLT 416 to route a Diameter message received from Diameter peer node "A" 402 and destined for Diameter peer node "B" 404 to egress Diameter MP 414, as identified by PRT/RLT 416. Moreover, because PRT/RLT 416 further identifies next-hop Diameter peer node "B" 404 and an egress connection ID "Conn_12" existing between Diameter MP 414 and Diameter peer node "B" 404, a subsequent Diameter lookup at Diameter MP 414 may not be required.

Figure 5:
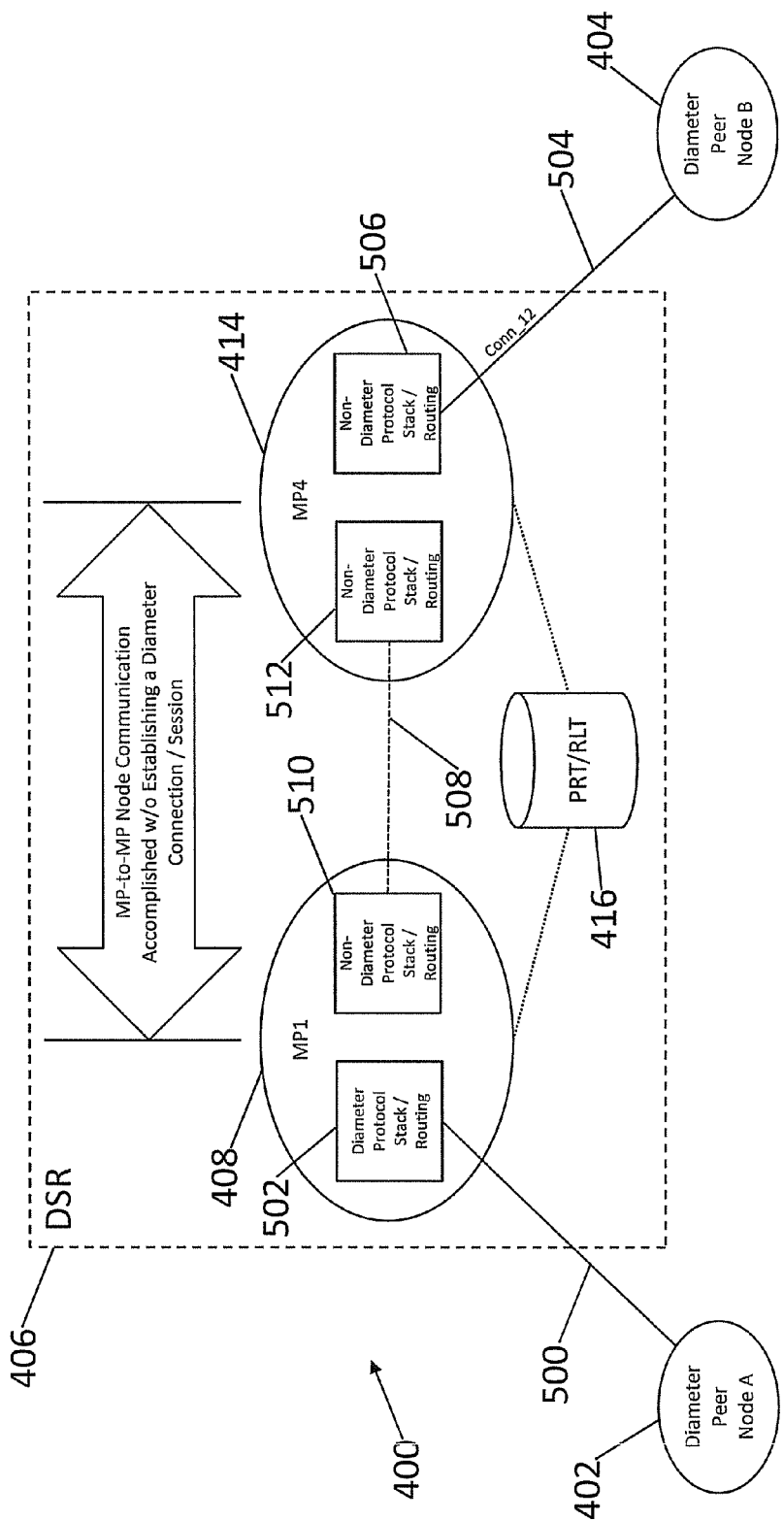
FIG. 5 is a network diagram illustrating in more detail exemplary MPs for routing Diameter messages according to an embodiment of the subject matter described herein.

FIG. 5 is a network diagram illustrating in more detail exemplary MPs for routing Diameter messages according to an embodiment of the subject matter described herein. Referring to FIG. 5, Diameter peer node "A" 402 may communicate with Diameter MP 408 via a Diameter protocol connection 500 that utilizes Diameter protocol/stack routing module 502 and Diameter peer node "B" 404 may communicate with Diameter MP 414 via a Diameter protocol connection 504 that utilizes Diameter protocol/stack routing module 506. In accordance with an embodiment of the subject matter described herein, Diameter MPs may communicate within the DSR via a non-Diameter protocol connection. For example, Diameter MPs 408 and 414 may respectively utilize non-Diameter protocol stack/routing modules 510 and 512 to communicate via non-Diameter protocol connection 508.

In accordance with an embodiment of the subject matter described herein, Diameter MPs may route a Diameter message between themselves using a non-Diameter protocol. Routing a Diameter message using a non-Diameter protocol may be advantageous by reducing the overhead required for a connection, for example, connection 508 between Diameter MPs 408 and 414. In addition, routing a Diameter message using a non-Diameter protocol may reduce the number of Diameter stack/routing lookups required for a Diameter message to pass from Diameter peer node "A" 402 to Diameter peer node "B" 404. For example, Diameter protocol stack/routing module 502 may be utilized for a Diameter message received by Diameter MP 408 from Diameter peer node "A" 402 and destined for Diameter peer node "B" 404. Diameter stack/routing module 502 may identify next-hop Diameter peer node "B" 404 and may further identify a non-Diameter protocol route for the message to travel through DSR 406. Diameter MPs 408 and 414 may utilize non-Diameter protocol stack routing modules 510 and 512 to route the message from Diameter MP 408 to Diameter MP 414 over non-Diameter protocol connection 508. Moreover, because Diameter protocol stack/routing module 502 has already identified Diameter peer node "B" 404 and a non-Diameter protocol route for the message to travel through DSR 406, non-Diameter protocol stack/routing module 506 may be utilized by Diameter MP 414 to route the message to Diameter peer node "B" 404, thereby reducing the overall number of Diameter lookups.

Routing Diameter messages using a non-Diameter protocol may enable Diameter peer nodes 402 and 404 to communicate in accordance with the Diameter protocol via DSR 406, while simultaneously facilitating communication within DSR 406 without the overhead associated with the establishment of a Diameter connection.

Figure 6:
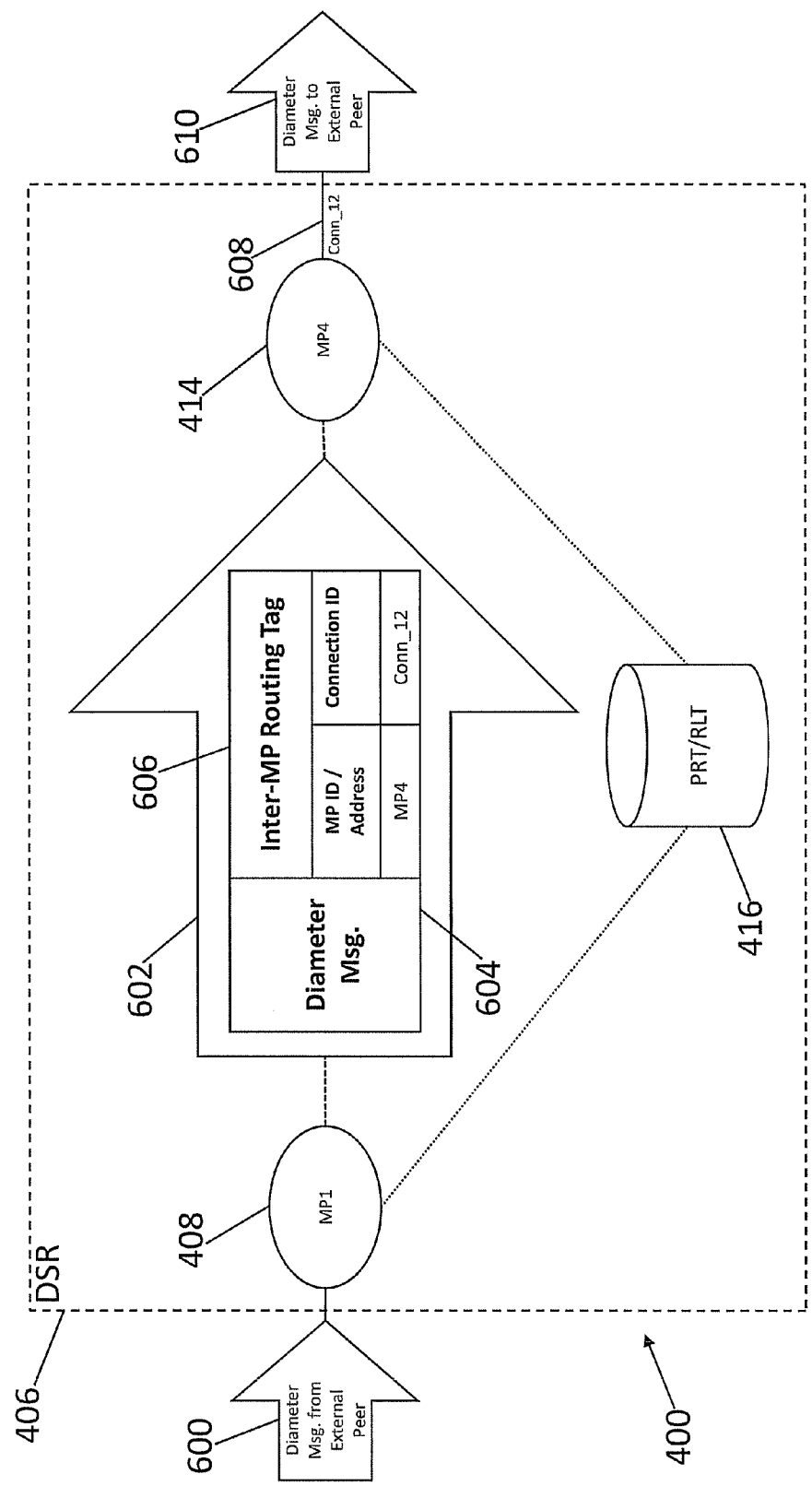
FIG. 6 is a network diagram illustrating an exemplary inter-MP message format used for routing Diameter messages between Diameter message processors using a non-Diameter protocol according to an embodiment of the subject matter described herein.

Non-Diameter protocol stack/routing module 510 may insert a Diameter message processor identifier and a Diameter connection identifier in a received message or add the identifiers to the message before sending the message to Diameter message processor 414. Non-Diameter protocol stack/routing module 512 may receive the message, examine the message processor identifier and the connection identifier, determine that an outbound Diameter route lookup is not required and that the message should be forwarded to next-hop Diameter node 414 via the connection identified in the message. In one embodiment, the non-Diameter protocol utilized may include an inter-processor message format that includes the original Diameter PDU along with a tag used for inter-MP routing. FIG. 6 is a network diagram illustrating an exemplary inter-MP message for routing Diameter messages using a non-Diameter protocol according to an embodiment of the subject matter described herein. Referring to FIG. 6, DSR 406 may include Diameter MPs 408 and 414. In accordance with an embodiment of the subject matter described herein, Diameter MP 408 may receive a Diameter message 600 from an external Diameter peer node. Diameter MP 408 may utilize routing information stored in PRT 416 to determine that the Diameter message is destined for a Diameter peer node having a Diameter connection with Diameter MP 414. Diameter MP 408 may create a non-Diameter protocol message 602 that contains at least a portion 604 of Diameter message 600. In one embodiment, non-Diameter protocol message 602 may encapsulate Diameter message 600. Non-Diameter protocol message 602 may include inter-MP routing tag 606. Inter-MP routing tag 606 may include, for example, the identity/address of a Diameter MP having a Diameter connection with the next-hop Diameter peer node and/or information identifying the Diameter connection between the Diameter MP and the next-hop Diameter peer node for the message. In the illustrated example, non-Diameter protocol message 602 includes inter-MP routing tag 606 which identifies Diameter MP 414 and connection 608 between Diameter MP 414 and a next-hop Diameter peer node.

In accordance with an embodiment of the subject matter described herein, Diameter MP 408 may route non-Diameter protocol message 602 to another Diameter MP. For example, Diameter MP 408 may route non-Diameter protocol message 602 to Diameter MP 414. Diameter MP 408 may insert or add inter-MP routing tag 606 to Diameter message 600 or message portion 604 prior to forwarding the message to Diameter MP 414. In one embodiment, Diameter MP 414 may determine that non-Diameter protocol message 602 is from a Diameter MP within DSR 406. For example, Diameter MP 414 may determine that non-Diameter protocol message 602 is from a Diameter MP within DSR 406 by detecting the existence of inter-MP routing tag 606, or Diameter MP 414 may determine that non-Diameter protocol message 602 is from a Diameter MP within DSR 406 based on the interface on which non-Diameter protocol message 602 is received. Diameter MP 414 may utilize inter-MP routing tag 606 to route the original Diameter message 600 or a portion thereof to an external Diameter peer node. For example, Diameter MP 414 may create a second Diameter message 610. Diameter message 610 may contain at least a portion 604 of Diameter message 600. Diameter MP 414 may forward Diameter message 610 to an external Diameter peer node via connection 608.

Figure 7:
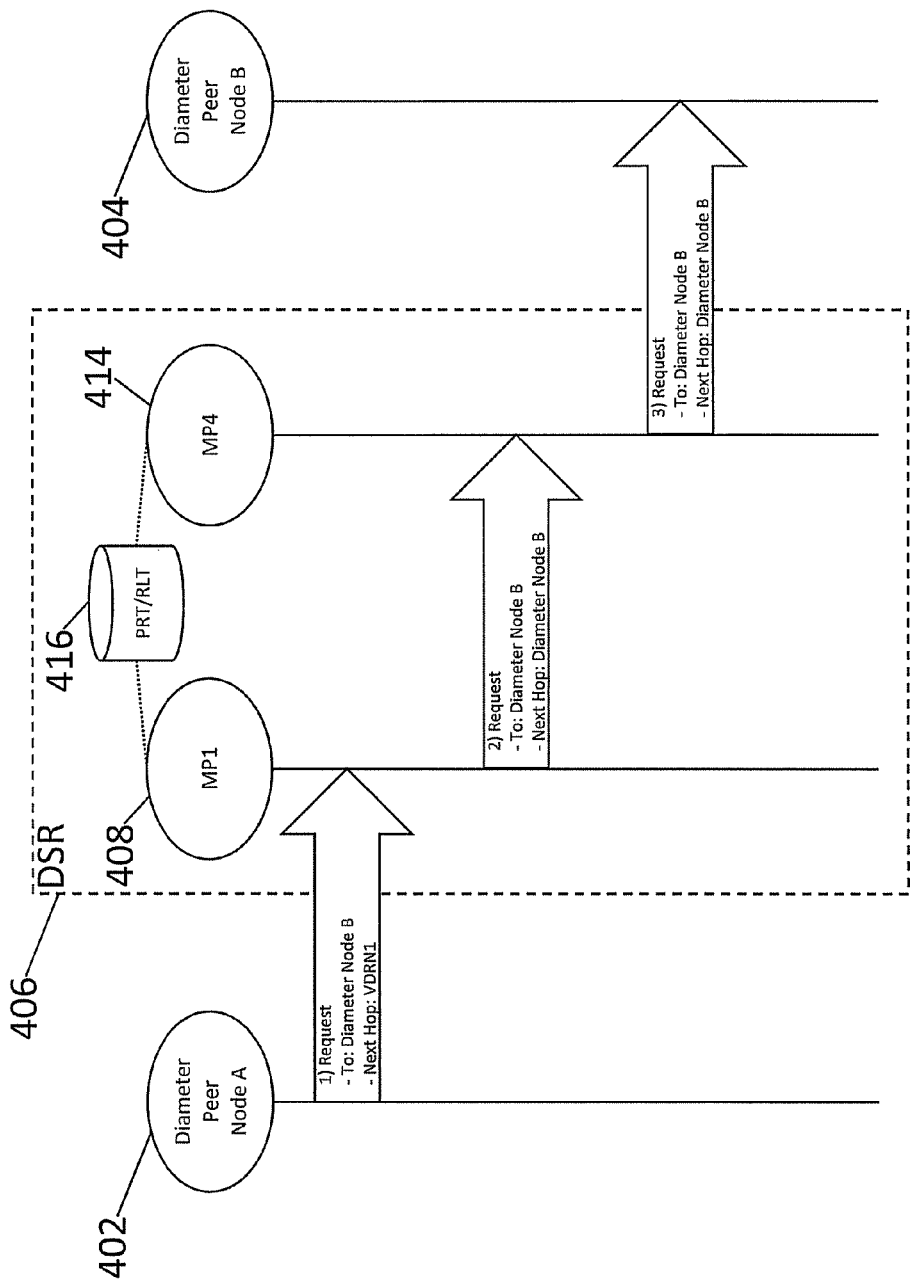
FIG. 7 is a message flow diagram illustrating the routing of a Diameter message according to an embodiment of the subject matter described herein.

FIG. 7 is a message flow diagram illustrating the routing of a Diameter message according to an embodiment of the subject matter described herein. Referring to FIG. 7, at step 1, Diameter peer node "A" 402 may send to Diameter peer node "B" 404 a request message according to the Diameter protocol. DSR 406, which includes Diameter MP 408 and Diameter MP 414, may serve a communication path existing between Diameter peer node "A" 402 and Diameter peer node "B" 404. Diameter MP 408 may receive the Diameter request message from Diameter peer node A 402 and create a non-Diameter protocol message that includes at least a part of the received Diameter request message. At step 2, Diameter MP 408 may route the non-Diameter protocol message that it created to Diameter MP 414. Diameter MP 414 may create a second Diameter message that includes the at least a portion of the first Diameter message. At step 3, Diameter MP 414 may forward the second Diameter message to Diameter peer node "B" 404.

FIGS. 8 and 9 illustrate exemplary data that may be stored in a peer routing table and associate route list table that may be used by Diameter message processors within a DSR for routing Diameter signaling messages between message processors according to an embodiment of the subject matter described herein. Referring to FIG. 8, peer routing table 800 includes a variety of fields that are used to route Diameter signaling messages. For example, a lookup may be performed at an ingress message processor based on a combination of destination host, destination realm, application identifier, originating host, and an originating realm parameter stored in the message. It should be noted that some or all of these parameters may be used in performing the route lookup. If the result of the lookup in the route table matches one of the entries, the action field in the route table is used to determine the action to be performed for the message. The route list field in the peer routing table is used to determine a route list identifier, which is used to perform a lookup in the route list table. Referring to FIG. 9, route list table 900 includes entries that are accessible via route list identifiers, which are determined from the peer routing table. The route list identifier determined from the peer routing table may match multiple entries in route list table 900. The priority, weight, and route status may be used to identify the route that a particular message will take. For example, if the route list determined for a message is "BLUE_NW," the selected route name may be "BLUE_PEER1," "BLUE_PEER2," or "BLUE_PEER3," depending on the priority of the message, the status of the route, and the weight assigned to the particular route.

The egress message processor identifier field contains data that is used to create the inter-MP status tag that is added to the message before sending the message to the egress message processor. The egress connection identifier field in the table is also added to the inter-MP routing tag and is used by the egress message processor to identify the egress Diameter connection.

FIG. 10 illustrates a table listing advantages associated with routing Diameter messages according to an embodiment of the subject matter described herein. Referring to FIG. 10, table 1000 graphically compares and contrasts the use of Diameter and non-Diameter message processor (MP)-to-MP protocols. Both Diameter and non-Diameter MP-to-MP protocols are Ethernet/IP based. While both Diameter and non-Diameter MP-to-MP protocols are reliable and connection oriented, utilizing non-Diameter MP-to-MP protocol is not limited to stream control transmission protocol (SCTP) or transmission control protocol (TCP). Diameter protocol provides security via standards-based security protocols such as Internet protocol security (IPSEC) and transport layer security (TLS) which are associated with high overhead. In contrast, non-Diameter MP-to-MP protocol security is provided via a closed/private network and is associated with low overhead. Diameter protocol message content is limited to Diameter standard protocol data unit (PDU) format. In contrast, non-Diameter MP-to-MP protocol may include Diameter standard PDU and may further include additional proprietary fields for minimizing processing overhead over the full ingress-egress path, handling error conditions, and managing in-service upgrades. Diameter protocol employs a routing strategy that utilizes Diameter routing at each MP which is associated with high overhead and relies primarily on static routing rules which results in perpetual message bouncing when egress paths are unavailable. In contrast, non-Diameter MP-to-MP protocol employs a routing strategy in which routing is optimized to minimize overhead across the full ingress-to-egress path using proprietary message content (e.g., by obviating the necessity for the egress node to perform another Diameter route lookup) and complements static routing rules with proprietary inter-MP status sharing to choose "available" egress paths.

Figure 11:
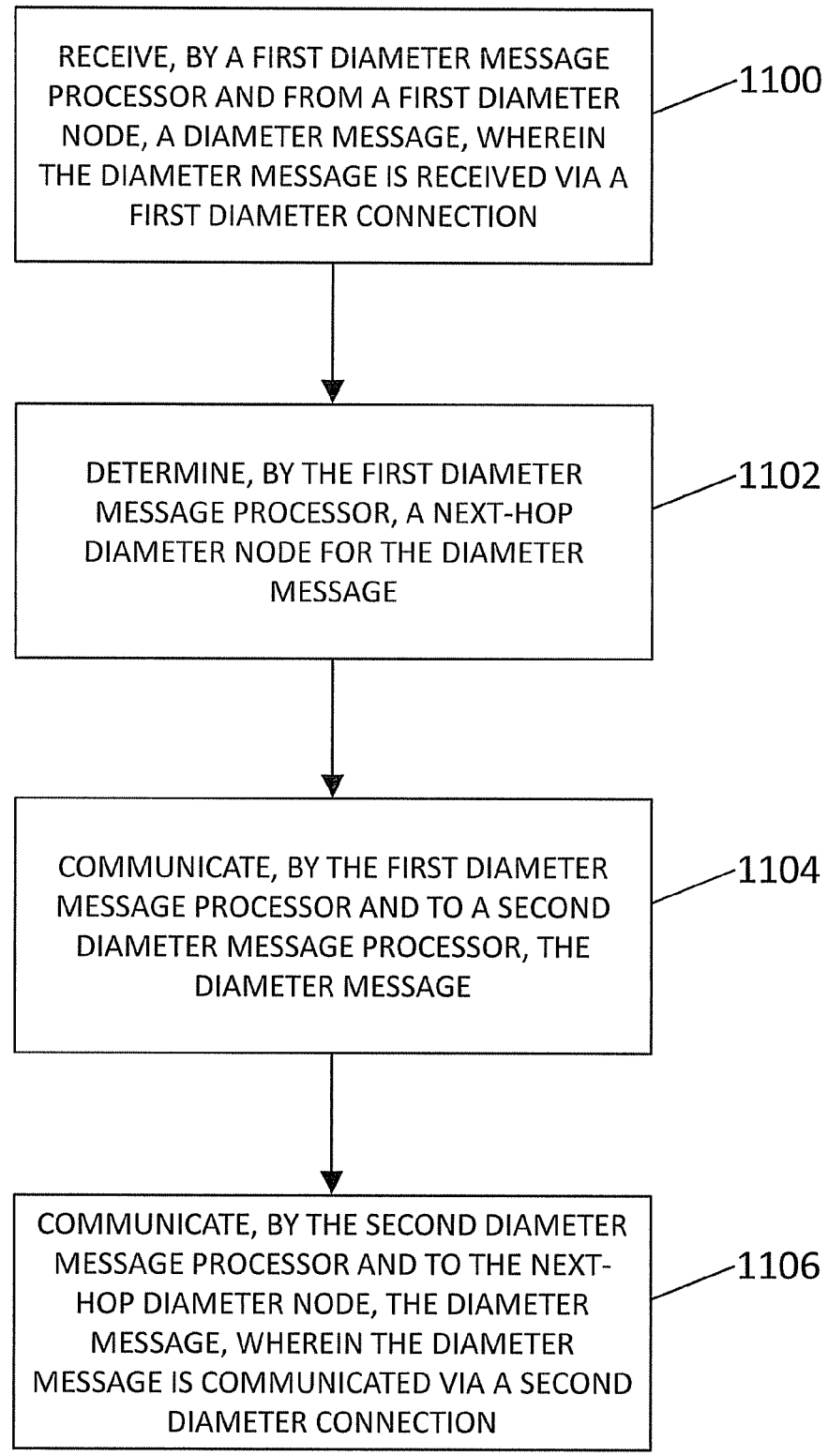
FIG. 11 is a flow chart illustrating an exemplary process for routing Diameter messages according to an embodiment of the subject matter described herein.

FIG. 11 is a flow chart illustrating an exemplary process for routing Diameter messages according to an embodiment of the subject matter described herein. Referring to FIG. 11, in step 1100, a first Diameter MP receives a Diameter message from a first Diameter node via a first Diameter connection. For example, an ingress message processor within a DSR may receive a message over a Diameter connection from a Diameter peer of the ingress message processor. In step 1102, the first Diameter MP determines a next-hop Diameter node for the Diameter message. For example, the first Diameter message processor may perform a lookup in a shared or non-shared peer routing table to determine the next-hop external Diameter node as well as the Diameter message processor within the DSR used to reach the next-hop Diameter node. In step 1104, the first Diameter MP communicates the Diameter message to a second Diameter MP. For example, the first MP may add the inter-MP status tag to the first Diameter message and forward the message with the tag to the egress Diameter MP. In step 1106, the second Diameter MP communicates the Diameter message to the next-hop Diameter node via a second Diameter connection. For example, the second Diameter MP may use information in the inter-MP status tag to identify the message as being directed to the egress MP, as not requiring another route lookup, and to identify the outbound Diameter connection to the peer.

Figure 12:
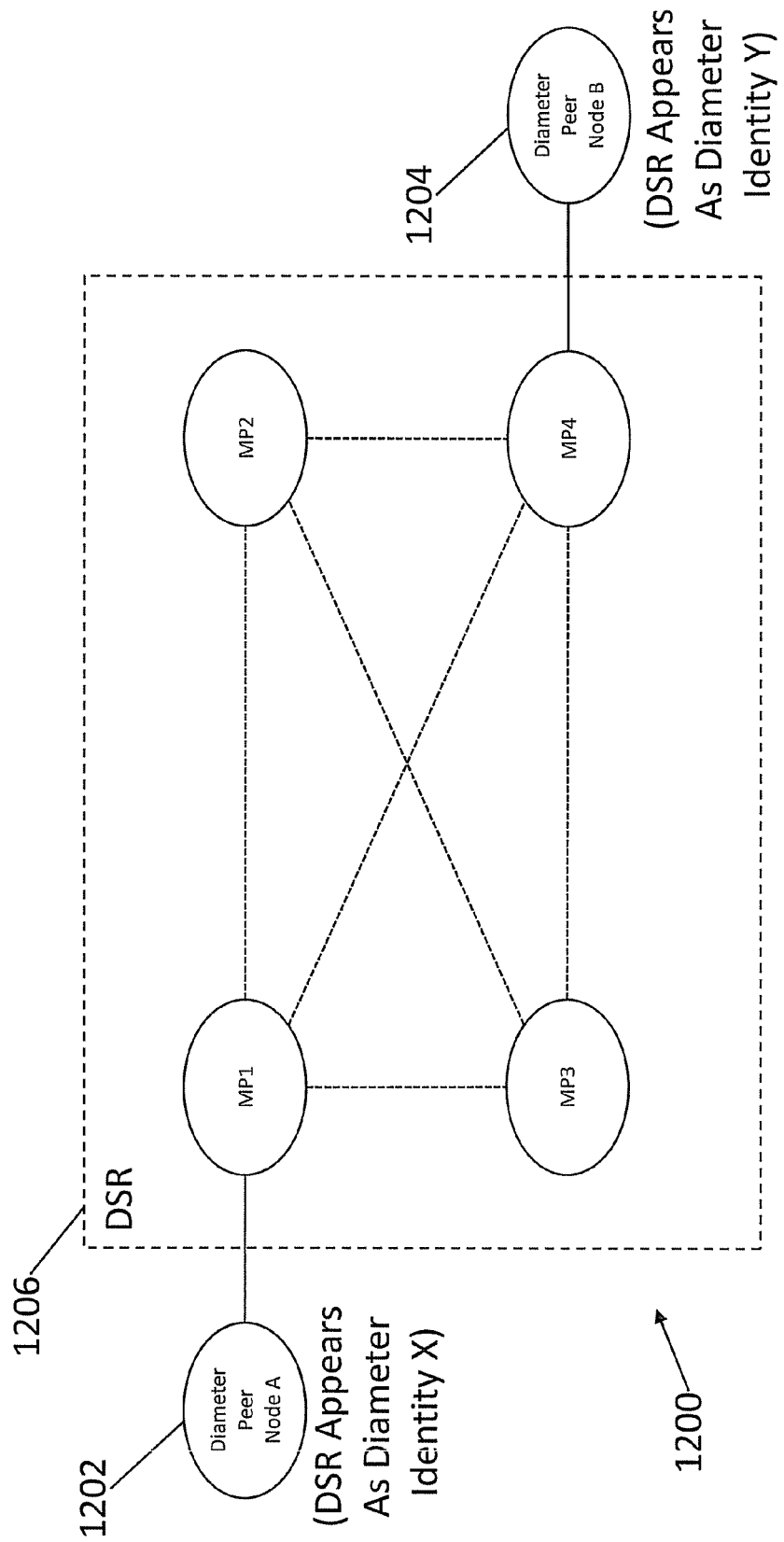
FIG. 12 is a network diagram illustrating an exemplary network that includes a DSR which appears to have different Diameter identities from the perspective of different Diameter peer nodes according to an embodiment of the subject matter described herein.

FIG. 12 is a network diagram illustrating an exemplary network that includes a DSR which appears to have different Diameter identities from the perspective of different Diameter peer nodes for routing Diameter messages according to an embodiment of the subject matter described herein. Referring to FIG. 12, network 1200 may include Diameter peer node "A" 1202 and Diameter peer node "B" 1204. Network 1200 may further include DSR 1206. In accordance with an embodiment of the subject matter described herein, DSR 1206 may appear to a first Diameter peer node as a first Diameter node having a first Diameter identity and appear to a second Diameter peer node as a second Diameter node having a second Diameter identity different from the first Diameter identity. For example, DSR 1206 may appear to Diameter peer node "A" 1202 as a first Diameter node having Diameter identity "X" and appear to Diameter peer node "B" 1204 as a second Diameter node having Diameter identity "Y."

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing Diameter messages, the method comprising:
at a Diameter signaling router (DSR) comprising a plurality of Diameter message processors:
receiving, by a first of the plurality of Diameter message processors and from a first Diameter node, a Diameter message, wherein the Diameter message is received via a first Diameter connection;
determining, by the first Diameter message processor, a next-hop Diameter node for the Diameter message;
communicating, by the first Diameter message processor and to a second of the plurality of Diameter message processors, the Diameter message; and
communicating, by the second Diameter message processor and to the next-hop Diameter node, the Diameter message, wherein the Diameter message is communicated via a second Diameter connection, wherein the first Diameter message processor adds an inter-message processor routing tag identifier to the Diameter message before sending the message to the second Diameter message processor and wherein the second Diameter message processor uses the inter-message processor routing tag to identify the message as being directed to it and as not requiring another Diameter routing lookup.

2. The method of claim 1 wherein the second Diameter message processor is configured to communicate the Diameter message based on the determination made by the first Diameter message processor.

3. The method of claim 1 wherein the first Diameter node and the next-hop Diameter node are peers of the first and second Diameter message processors, respectively, and are respectively connected to the first and next-hop Diameter nodes using the first and second Diameter connections.

4. The method of claim 1 wherein the first and second Diameter message processors are not connected to each other via a Diameter connection.

5. The method of claim 1 wherein the first and second Diameter message processors share or access a common Diameter peer routing table.

6. The method of claim 1 each of the first and second Diameter message processors includes a peer routing table.

7. The method of claim 1 wherein the first Diameter message processor appears to the first Diameter node having a first Diameter identity and the second Diameter message processor appears to the next-hop Diameter node as having a second Diameter identity, the first and second Diameter identities being different from each other.

8. The method of claim 1 wherein the first and second Diameter message processors appear to the first Diameter node and the next-hop Diameter node as a single Diameter node having a single Diameter identity, the single Diameter identity being associated with the DSR.

9. The method of claim 1 wherein at least one of the first and second of the plurality of Diameter message processors comprises one of:
a distinct message processing module of a distributed computing platform;
a computing blade in a blade-based distributed computing platform;
a processing core element associated with a single or multi-core computing device; and
a virtual node instantiated on a single physical message processing / computing device.

10. A system for routing Diameter messages, the system comprising:
a Diameter signaling router (DSR) including:
first and second Diameter message processors, wherein the first Diameter message processor is configured to:
receive, from a first Diameter node and via a first Diameter connection, a Diameter message;
determine a next-hop Diameter node for the Diameter message;
and
communicate, to the second Diameter message processor, the Diameter message, and wherein the second Diameter message processor is configured to communicate to the next-hop Diameter node, via a second Diameter connection, the Diameter message, wherein the first Diameter message processor adds an inter-message processor routing tag identifier to the Diameter message before sending the message to the second Diameter message processor and wherein the second Diameter message processor uses the inter-message processor routing tag to identify the message as being directed to it and as not requiring another Diameter routing lookup.

11. The system of claim 10 wherein the second Diameter message processor is configured to communicate the Diameter message based on the determination made by the first Diameter message processor.

12. The system of claim 10 wherein the first Diameter node and the next-hop Diameter node are peers of the first and second Diameter message processors, respectively, and are respectively connected to the first and next-hop Diameter nodes using the first and second Diameter connections.

13. The system of claim 10 wherein the first and second Diameter message processors are not connected to each other via a Diameter connection.

14. The system of claim 10 wherein the first and second Diameter message processors share or access a common Diameter peer routing table.

15. The system of claim 10 wherein each of the first and second Diameter message processors includes a peer routing table.

16. The system of claim 10 wherein the first Diameter message processor appears to the first Diameter node as having a first Diameter identity and the second Diameter message processor appears to the next-hop Diameter node as having a second Diameter identity, the first and second Diameter identities being different from each other.

17. The system of claim 10 wherein the first and second Diameter message processors appear to the first Diameter node and the next-hop Diameter node as a single Diameter node having a single Diameter identity, the single Diameter identity being associated with the DSR.

18. The system of claim 10 wherein at least one of the first and second Diameter message processors comprises one of:
a distinct message processing module of a distributed computing platform;
a computing blade in a blade-based distributed computing platform;
a processor core element associated with a single or multi-core computing device; and
a virtual node instantiated on a single physical message processing / computing device.

19. A system for routing Diameter messages, the system comprising:
a first Diameter node;
a second Diameter node; and
a Diameter signaling router (DSR), wherein the DSR appears to the first Diameter node as a first Diameter peer having a first Diameter identity and the DSR appears to the second Diameter node as a second Diameter peer having a second Diameter identity, the second Diameter identity and the first Diameter identity being different, wherein the DSR comprises a first Diameter message processor and a second Diameter message processor, wherein the first Diameter message processor adds an inter-message processor routing tag identifier to the Diameter message before sending the message to the second Diameter message processor and wherein the second Diameter message processor uses the inter-message processor routing tag to identify the message as being directed to it and as not requiring another Diameter routing lookup.

20. A non-transitory computer readable medium comprising computer executable instructions that when executed by a processor of a computer control the computer to perform steps comprising:
at a Diameter signaling router (DSR) comprising a plurality of Diameter message processors:
receiving, by a first of the plurality of Diameter message processors and from a first Diameter node, a Diameter message, wherein the Diameter message is received via a first Diameter connection;
determining, by the first Diameter message processor, a next-hop Diameter node for the Diameter message;
communicating, by the first Diameter message processor and to a second of the plurality of Diameter message processors, the Diameter message; and communicating, by the second Diameter message processor and to the next-hop Diameter node, the Diameter message, wherein the Diameter message is communicated via a second Diameter connection, wherein the first Diameter message processor adds an inter-message processor routing tag identifier to the Diameter message before sending the message to the second Diameter message processor and wherein the second Diameter message processor uses the inter-message processor routing tag to identify the message as being directed to it and as not requiring another Diameter routing lookup.

* * * * *